US010430609B2

(12) United States Patent
Kamijoh et al.

(10) Patent No.: US 10,430,609 B2
(45) Date of Patent: Oct. 1, 2019

(54) LOW PRIVACY RISK AND HIGH CLARITY SOCIAL MEDIA SUPPORT SYSTEM

(71) Applicant: INTERNATIONAL BUSINESS MACHINES CORPORATION, Armonk, NY (US)

(72) Inventors: Kohichi Kamijoh, Kanagawa-Ken (JP); Masaki Ono, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 181 days.

(21) Appl. No.: 15/275,139

(22) Filed: Sep. 23, 2016

(65) Prior Publication Data
US 2018/0089464 A1 Mar. 29, 2018

(51) Int. Cl.
*G06F 21/62* (2013.01)
*G06F 16/2457* (2019.01)

(52) U.S. Cl.
CPC ...... *G06F 21/6245* (2013.01); *G06F 16/2457* (2019.01)

(58) Field of Classification Search
CPC ......... G06F 17/30569; G06F 17/30672; G06F 17/30864; G06F 21/6254; G06F 21/6263; G06F 17/30867
See application file for complete search history.

(56) References Cited

U.S. PATENT DOCUMENTS

| 7,512,985 | B1* | 3/2009 | Grabarnik | G06F 21/6263 |
| | | | | 707/999.009 |
| 8,725,714 | B2* | 5/2014 | Ai | G06F 21/6254 |
| | | | | 705/14.49 |
| 9,043,302 | B1* | 5/2015 | Shimshoni | G06F 17/30716 |
| | | | | 707/706 |

(Continued)

OTHER PUBLICATIONS

Peddinti S.T., Saxena N. (2010) On the Privacy of Web Search Based on Query Obfuscation: A Case Study of TrackMeNot. In: Atallah M.J., Hopper N.J. (eds) Privacy Enhancing Technologies. PETS 2010. Lecture Notes in Computer Science, vol. 6205. Springer, Berlin, Heidelberg (Year: 2010).*

*Primary Examiner* — Farid Homayounmehr
*Assistant Examiner* — Zhimei Zhu
(74) *Attorney, Agent, or Firm* — Tutunjian & Bitetto, P.C.; Vazken Alexanian

(57) ABSTRACT

A method and system are provided. The method includes separating initial user-inputted data into terms. The method further includes determining which terms are identity-related terms relating to an identity of a user, and which terms are clarity-related terms relating to subject-matter clarity. The method also includes calculating a population. The population is a number of individuals satisfying the identity-related terms. The method additionally includes assigning, for each clarity-related term, a clarity level, representing a respective amount of clarity for a respective one of the clarity-related terms. The method further includes creating (Continued)

amended user-inputted data by amending the initial user-inputted data such that the population is greater than or equal to a first threshold, and such that the clarity level, assigned for each clarity-related term, is greater than or equal to a second threshold. The method also includes transmitting, using a graphical user interface, the amended user-inputted data to respondents.

15 Claims, 9 Drawing Sheets

(56) References Cited

U.S. PATENT DOCUMENTS

| | | | | |
|---|---|---|---|---|
| 9,176,944 | B1* | 11/2015 | Coker | G06F 17/276 |
| 9,177,029 | B1* | 11/2015 | Chau | G06F 17/30867 |
| 9,721,020 | B2* | 8/2017 | Clark | G06F 17/30867 |
| 9,721,023 | B2* | 8/2017 | Clark | G06F 17/30867 |
| 9,911,005 | B2* | 3/2018 | Ho | G06F 21/6263 |
| 2002/0103806 | A1* | 8/2002 | Yamanoue | G06F 17/30867 |
| 2007/0136237 | A1* | 6/2007 | Barker | G06F 21/6227 |
| 2007/0143260 | A1* | 6/2007 | Markov | G06Q 30/02 |
| 2008/0005264 | A1* | 1/2008 | Brunell | G06F 21/6254 |
| | | | | 709/217 |
| 2008/0095519 | A1* | 4/2008 | You | G11B 27/105 |
| | | | | 386/224 |
| 2008/0104128 | A1* | 5/2008 | Drayer | G06F 21/6245 |
| 2009/0112805 | A1* | 4/2009 | Garbow | G06F 17/30864 |
| 2009/0265319 | A1* | 10/2009 | Lehrman | G06F 17/30867 |
| 2009/0265326 | A1* | 10/2009 | Lehrman | G06F 17/30867 |
| 2010/0114840 | A1* | 5/2010 | Srivastava | G06F 17/30536 |
| | | | | 707/688 |
| 2010/0169294 | A1* | 7/2010 | Gerber | G06F 17/30864 |
| | | | | 707/706 |
| 2011/0040797 | A1* | 2/2011 | Haskell | G06Q 10/10 |
| | | | | 707/797 |
| 2011/0113038 | A1* | 5/2011 | Corbin | G06F 17/30672 |
| | | | | 707/748 |
| 2011/0238492 | A1* | 9/2011 | Newnam | G06Q 30/02 |
| | | | | 705/14.43 |
| 2013/0138698 | A1* | 5/2013 | Harada | G06F 17/30327 |
| | | | | 707/797 |
| 2013/0198024 | A1* | 8/2013 | Sutter | G06F 17/30861 |
| | | | | 705/26.3 |
| 2013/0282759 | A1* | 10/2013 | Proux | G06F 17/30864 |
| | | | | 707/774 |
| 2013/0291128 | A1* | 10/2013 | Ito | G06F 21/6254 |
| | | | | 726/30 |
| 2014/0089090 | A1* | 3/2014 | Thrasher | G06F 17/30864 |
| | | | | 705/14.54 |
| 2014/0129569 | A1* | 5/2014 | Seeger | G06F 17/30867 |
| | | | | 707/748 |
| 2014/0208437 | A1* | 7/2014 | Sasaki | G06Q 30/02 |
| | | | | 726/26 |
| 2015/0007249 | A1* | 1/2015 | Bezzi | G06F 21/6254 |
| | | | | 726/1 |
| 2015/0039579 | A1* | 2/2015 | Clark | G06F 17/30867 |
| | | | | 707/706 |
| 2015/0293923 | A1* | 10/2015 | Eide | G06F 17/30321 |
| | | | | 707/749 |
| 2015/0324396 | A1* | 11/2015 | Sheik Adam | H04L 63/0407 |
| | | | | 707/792 |
| 2015/0339493 | A1* | 11/2015 | Ioannidis | G06F 21/6245 |
| | | | | 726/28 |
| 2015/0379303 | A1* | 12/2015 | LaFever | G06F 21/6218 |
| | | | | 726/28 |
| 2016/0140190 | A1* | 5/2016 | Moncrieff | G06F 17/30554 |
| | | | | 707/722 |
| 2016/0283745 | A1* | 9/2016 | LaFever | G06F 21/6254 |
| 2016/0379231 | A1* | 12/2016 | Sheppard | G06Q 30/0204 |
| | | | | 705/7.33 |
| 2017/0169253 | A1* | 6/2017 | Curcio | G06F 21/6263 |
| 2017/0195365 | A1* | 7/2017 | Basson | H04L 63/20 |
| 2017/0220943 | A1* | 8/2017 | Duncan | G06N 5/04 |
| 2017/0270316 | A1* | 9/2017 | Ho | G06F 21/6245 |
| 2017/0308717 | A1* | 10/2017 | Huang | G06F 19/28 |
| 2017/0316346 | A1* | 11/2017 | Park | G06F 17/11 |
| 2017/0337397 | A1* | 11/2017 | Tang | G06F 21/6254 |
| 2017/0359313 | A1* | 12/2017 | Livneh | H04L 63/0414 |
| 2018/0004978 | A1* | 1/2018 | Hebert | G06F 17/30522 |
| 2018/0052894 | A1* | 2/2018 | Eide | G06F 7/582 |

\* cited by examiner

| Vc/Tc | TABLE 3 | | | | | | | |
|---|---|---|---|---|---|---|---|---|
| | | 0.2 | 0.4 | 0.6 | 0.8 | 1.0 | 1.2 | 1.4 | 1.6 |
| Vs/Ts | 0.2 | 9 | 9 | 8 | 5 | 3 | 1 | 0 | 0 |
| | 0.4 | 9 | 8 | 7 | 6 | 3 | 0 | 0 | 0 |
| | 0.6 | 9 | 8 | 6 | 4 | 2 | 0 | 0 | 0 |
| | 0.8 | 8 | 8 | 6 | 4 | 2 | 0 | 0 | 0 |
| | 1.0 | 8 | 8 | 6 | 4 | 0 | 0 | 0 | 0 |
| | 1.2 | 8 | 8 | 6 | 4 | 0 | 0 | 0 | 0 |
| | 1.4 | 7 | 7 | 6 | 4 | 0 | 0 | 0 | 0 |
| | 1.6 | 7 | 7 | 6 | 3 | 0 | 0 | 0 | 0 |

FIG. 9

LOW PRIVACY RISK AND HIGH CLARITY SOCIAL MEDIA SUPPORT SYSTEM

BACKGROUND

Technical Field

The present invention generally relates to privacy protection, and, more particularly, to social media support systems that satisfy low privacy risk and high clarity.

Description of the Related Art

Many social media processes and applications require users to input various types and amounts of data. For example, for write-in questions, inquiries, and consultations in social media, users are often required, to some extent, to input specific public information and personal information such as, the user's age, address, education, profession, annual income, family structure, etc. A downside to inputting personal information on social media is that, the more personal information a user inputs on social media, and the more frequently the user inputs that information, the higher the probability that some form of leakage of the personal information will occur.

Due to the possibility of leakage of personal data, there has been a growing need for some form of system/method that enables users to input personal information on social media while still maintaining the privacy of the users and at the same time enabling one or more respondents to be able to accurately respond to the user's information.

SUMMARY

According to an aspect of the present principles, a method is provided for decreasing privacy risk and increasing clarity in a social media system. The method includes separating initial user-inputted data into a plurality of terms. The method further includes determining which of the plurality of terms are identity-related terms relating to an identity of a user, and which of the plurality of terms are clarity-related terms relating to subject-matter clarity. The method also includes calculating, using a processor, a population. The population is a number of individuals that satisfies the identity-related terms. The method additionally includes assigning, for each of the clarity-related terms, a clarity level. The clarity level represents a respective amount of clarity for a respective one of the clarity-related terms. The method further includes creating amended user-inputted data by amending the initial user-inputted data such that the population is greater than or equal to a first predefined threshold, and such that the clarity level, assigned for each of the clarity-related terms, is greater than or equal to a second predefined threshold. The method also includes transmitting, using a graphical user interface, the amended user-inputted data to one or more respondents.

According to another aspect of the present principles, a non-transitory computer-readable storage medium is provided. The non-transitory computer-readable storage medium includes a computer-readable program for decreasing privacy risk and increasing clarity in a social media system. The computer-readable program when executed on a computer causes the computer to perform a method. The method includes separating initial user-inputted data into a plurality of terms. The method further includes determining which of the plurality of terms are identity-related terms relating to an identity of a user, and which of the plurality of terms are clarity-related terms relating to subject-matter clarity. The method also includes calculating, using a processor, a population. The population is a number of individuals that satisfies the identity-related terms. The method additionally includes assigning, for each of the clarity-related terms, a clarity level. The clarity level represents a respective amount of clarity for a respective one of the clarity-related terms. The method further includes creating amended user-inputted data by amending the initial user-inputted data such that the population is greater than or equal to a first predefined threshold, and such that the clarity level, assigned for each of the clarity-related terms, is greater than or equal to a second predefined threshold. The method additionally includes transmitting, using a graphical user interface, the amended user-inputted data to one or more respondents.

According to yet another aspect of the present principles, a system is provided for decreasing privacy risk and increasing clarity in a social media system. The system includes a processor configured to separate initial user-inputted data into a plurality of terms. The processor is further configured to determine which of the terms are identity-related terms relating to an identity of a user, and which of the terms are clarity-related terms relating to subject-matter clarity. The processor is also configured to calculate a population. The population is a number of individuals that satisfies the identity-related terms. The processor is additionally configured to assign, for each of the clarity-related terms, a clarity level. The clarity level represents a respective amount of clarity for a respective one of the clarity-related terms. The processor is further configured to create amended user-inputted data by amending the initial user-inputted data so that the population is greater than or equal to a first predefined threshold, and so that the clarity level, assigned for each of the clarity-related terms, is greater than or equal to a second predefined threshold. The system further includes a memory configured to store the initial user-inputted data, the population, the clarity values, the first predefined threshold, and the second predefined threshold. The system also includes a graphical user interface configured to transmit the amended user-inputted data to one or more respondents.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The following description will provide details of preferred embodiments with reference to the following figures wherein:

FIG. 9 depicts TABLE 3 showing the least necessary amount to change db(dWDB), assuming, from TABLE 1, that g=3, Ts=13000, and Tc=16. In detail, first calculate Vs/Ts and Vc/Tc with original W, in accordance with an embodiment of the present invention.

DETAILED DESCRIPTION

The present invention is directed to a social media support system that satisfies low privacy risk and high clarity. In accordance with the present invention, the described system receives original (initial) user-inputted data, alters the original user-inputted data to maintain the privacy of a user while also maintaining the clarity of the user-inputted data within a threshold, and submits the altered user-inputted data to one or more respondents so that the one or more respondents can accurately respond to any inquiries the user may have.

For online user inquiries, users typically input the information that is required to enable a respondent to accurately respond to any questions/concerns the users may have. The more information the users provide, the more accurate a respondent's response can be. However, many users may wish for most or all of the information they provide to not fall into the possession of unwanted third parties. Due to the amount of information users provide, and the increased frequency of user-submitted information in the Internet age, leakage of the user-inputted information is an issue. Leakage of information can lead to unwanted third parties gaining access to the information that the users supplied. In the system according to the present invention, terms are extracted from the original user-inputted data and, from these terms, identifiable information about the user and clarity information concerning the user's inquiry, based on predefined factors, are extrapolated. The system then alters the original user-inputted data to maintain the user's privacy and maintain the clarity of the user's original user-inputted data. Once any alterations are made to the original user-inputted data, the altered user-inputted data is submitted to one or more respondents so that the one or more respondents can accurately respond to the user's inquiry.

Strictly making alterations to the user-inputted data to protect the privacy of the user may lead to alterations the decrease the clarity of the user's inquiry. Furthermore, strictly making alterations to the user-inputted data to increase the clarity of the user-inputted data may lead to a decrease in the user's privacy. By making alterations to increase the privacy of a user while conjunctively making alterations to increase the clarity of the user's inquiry, the system in according to the present principle is able to submit clear information to one or more respondents while maintaining the user's privacy.

Figure 1:
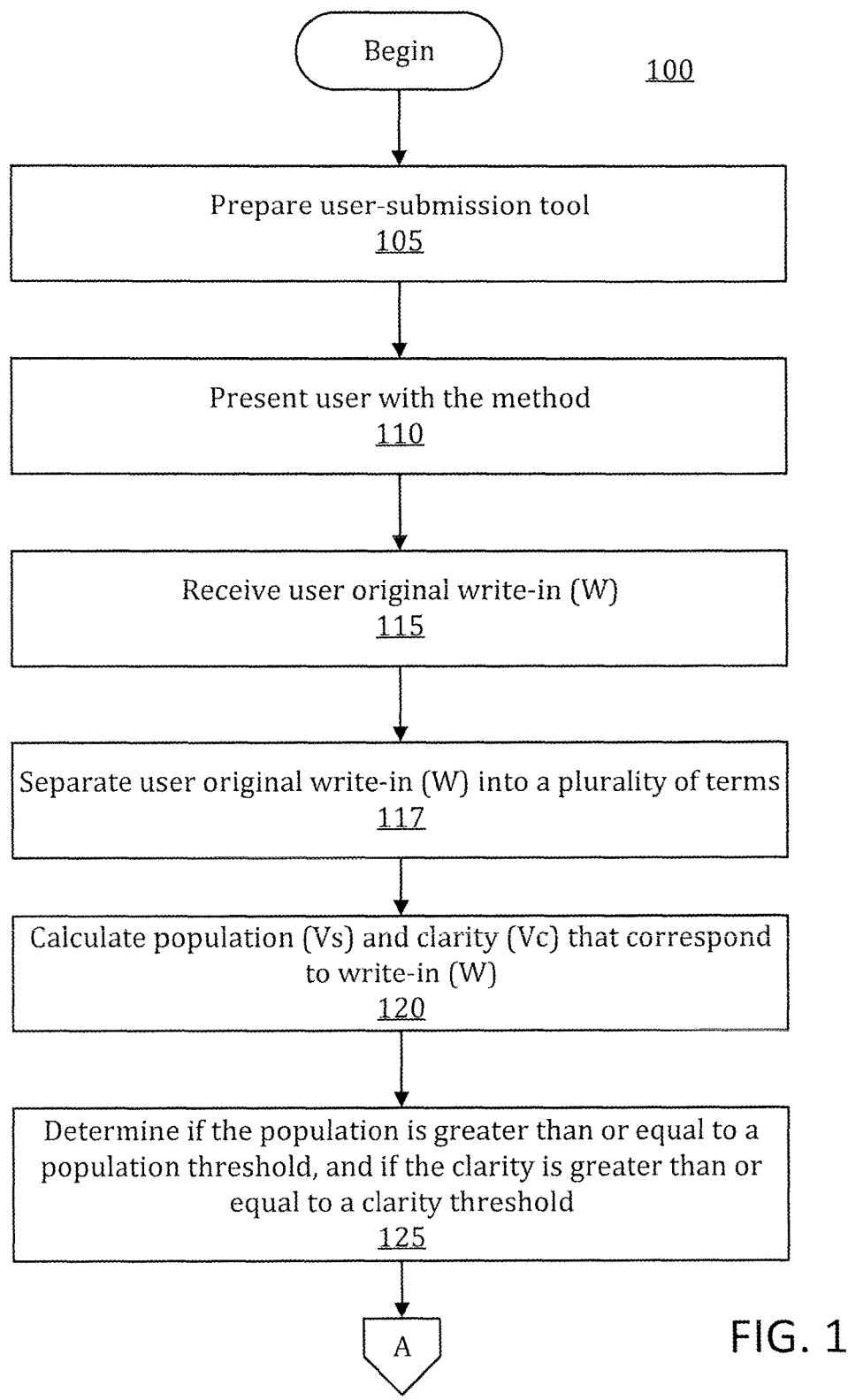
FIG. 1-3 show an exemplary method for allowing users to share an amount of information required in order to enable respondents to accurately answer any inquiries, while still maintaining the privacy of the users, in accordance with an embodiment of the present invention.
Figure 2:
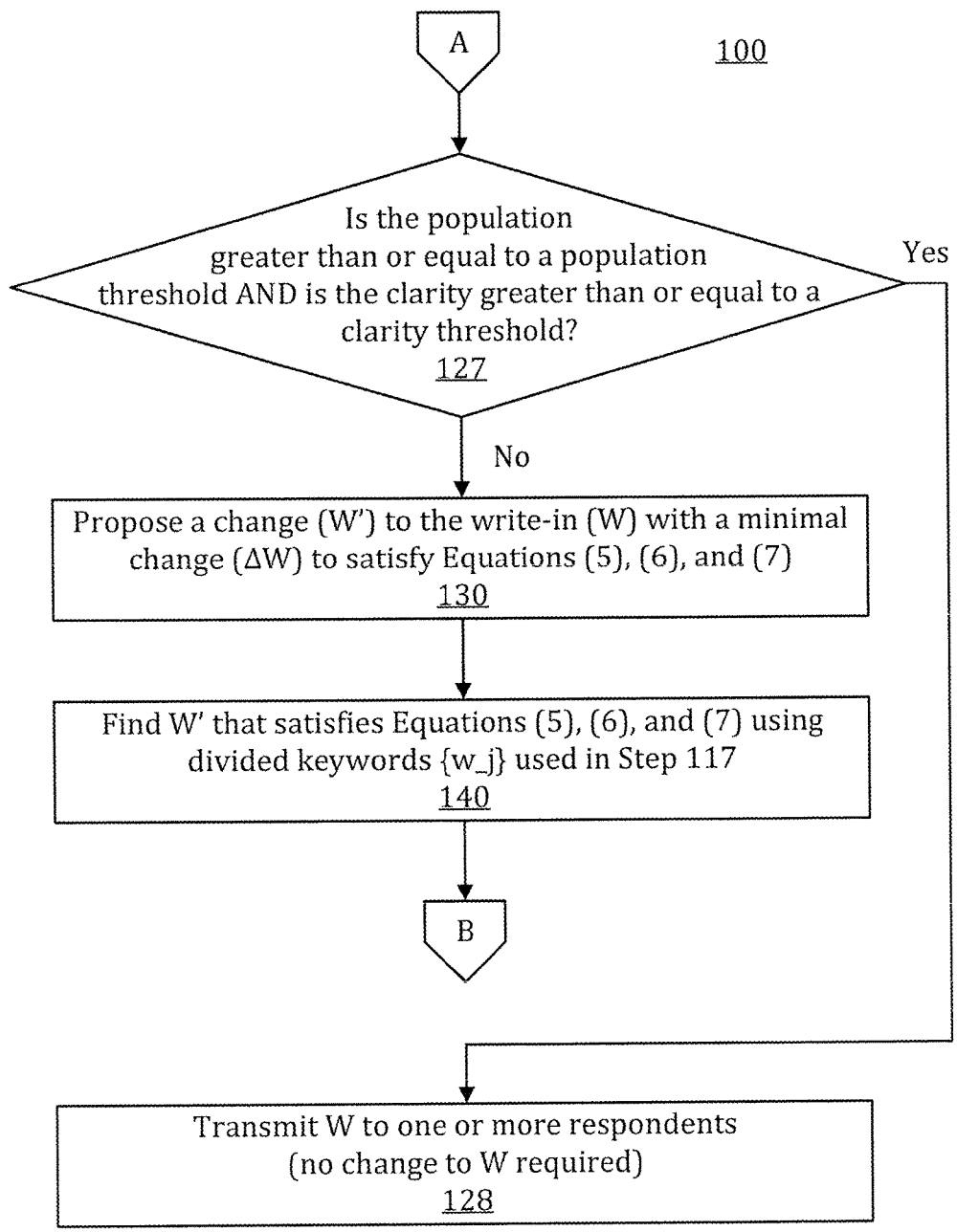
Figure 3:
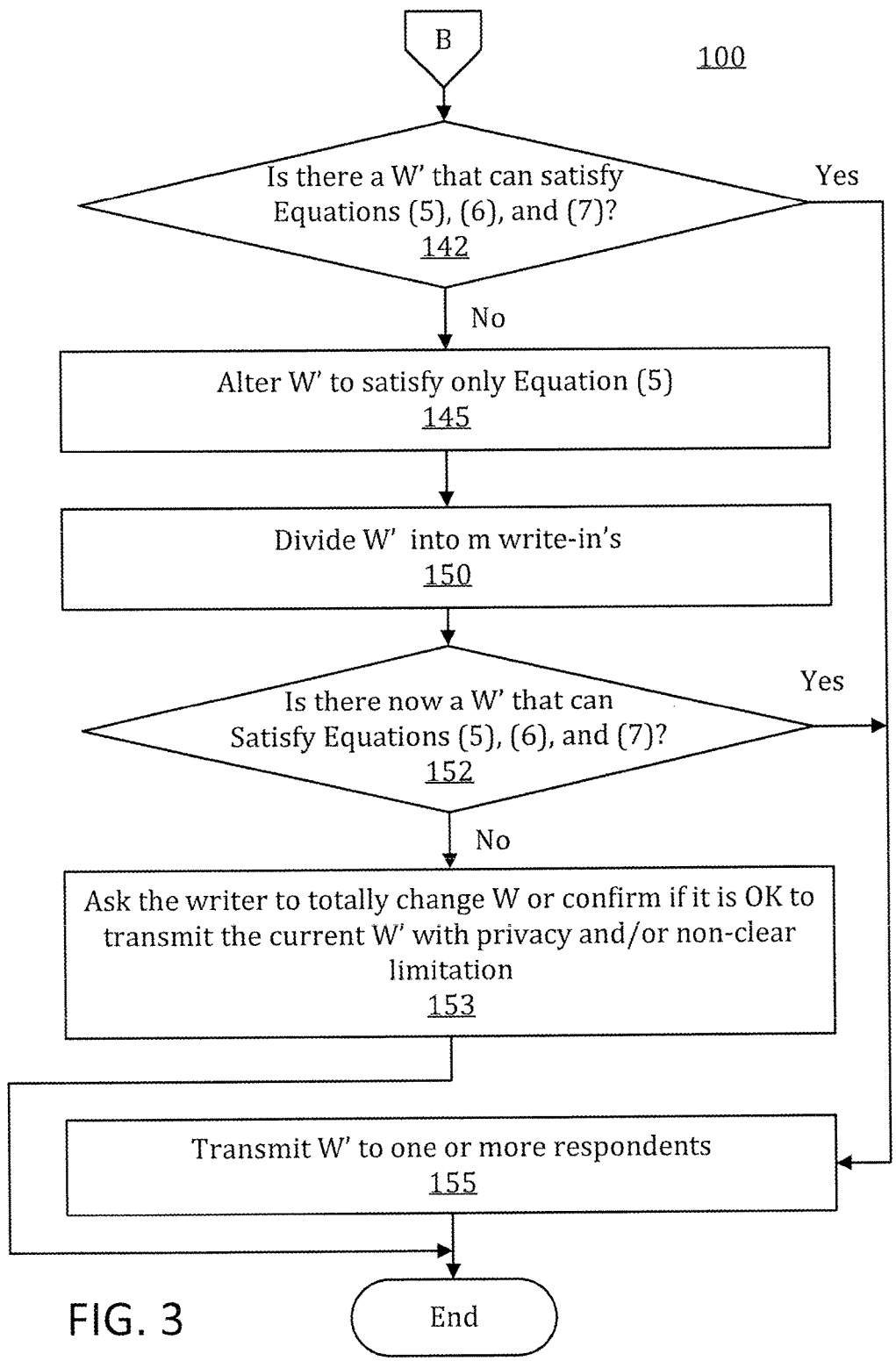

Referring now to the drawings in which like numerals represent the same or similar elements and initially to FIGS. 1-3, an exemplary method 100 is provided for allowing users to share an amount of information required in order to enable respondents to accurately respond, while still maintaining the privacy of the users, in accordance with an embodiment of the present invention.

At step 105, prepare a user-submission tool. The user-submission tool is a digital outlet by which the user has the ability to submit the original user-inputted data. The tool can be, e.g., a questionnaire, a general inquiry, an open-ended form, etc. Predefined categories (g) and keyword items (i) are incorporated into each tool, and an abstraction level ($a\_i$) and a clarity level ($c\_\{gi\}$) are prepared. Categories (g) are subject-matter factors and pertain to what the user is writing about, and are typically automatically defined by the system, which, according to an embodiment, is machine-learned using past user-submitted data. The keyword items (i) consist of factors that are important to define the clarity of the original user-inputted data (also known as a "write-in"). Clarity levels ($c\_\{gi\}$) are assigned for each combination of category (g) and item (i). TABLE 1, e.g., shows a prepared abstraction level ($a\_i$) and clarity level ($c\_\{gi\}$) for a write-in questionnaire.

TABLE 1

| Item (i) | Publication Level | Abstraction Level ($a\_i$) | Clarity level($c\_\{gi\}$) Per Category (g) | | |
|---|---|---|---|---|---|
| | | | Life Insurance (g = 1) | Asset Management (g = 2) | Welfare System (g = 3) |
| Address (i = 1) | Town | 1 | 5 | 6 | 5 |
| | City, Ward | 2 | 4 | 5 | 4 |
| | Prefecture, Region | 3 | 2 | 3 | 3 |
| | Nation | 4 | 1 | 1 | 1 |
| Name (i = 2) | Full Name | 1 | — | — | — |
| | Family Name | 2 | — | — | — |
| | Given Name | 3 | — | — | — |
| | Initial | 4 | — | — | — |
| Age (i = 3) | Actual Age | 1 | 10 | 5 | 9 |
| | What Teen, School Grade | 2 | 8 | 4 | 5 |
| Occupation (i = 4) | Company Name + Department | 1 | 5 | 6 | 6 |
| | Company Name | 2 | 3 | 5 | 6 |
| | Sort of Occupation | 3 | 2 | 3 | 1 |
| Employment Condition (i = 5) | Regular Employee, Part Timer | 1 | 1 | 1 | 2 |
| Family Structure (i = 6) | Marriage + Age of Children | 1 | 8 | 7 | 6 |
| | Marriage + Number of Children | 2 | 6 | 6 | 4 |
| | Marriage | 3 | 5 | 5 | 2 |

TABLE 1-continued

| | | | Clarity level($c\_\{gi\}$) Per Category (g) | | |
|---|---|---|---|---|---|
| Item (i) | Publication Level | Abstraction Level (a_i) | Life Insurance (g = 1) | Asset Management (g = 2) | Welfare System (g = 3) |
| Annual Income (i = 7) | XX Million Yen | 1 | 8 | 8 | 5 |
| | Order of XX Million Yen | 3 | 4 | 5 | 1 |
| | Above/Below XX Million Yen | 3 | 4 | 5 | 1 |

At step 110, present a user with the user-submission tool on, e.g., a social media webpage.

At step 115, receive, by a system, a write-in (W) from a user. This information includes, e.g., data necessary for a respondent to accurately respond to the user and can include personal and/or private information (e.g., name, age, address, income, family history, medical history, etc.).

At step 117, separate the write-in into a plurality of terms (or keywords $\{w\_j\}$).

At step 120, calculate, using the system, a population (Vs) and a clarity, or clarity value, (Vc), which is calculated by using clarity levels of each term, one of the methods to calculate the Vc is to calculate the sum of the clarity levels as Equation (2), that correspond to W.

The system determines which terms in the write-in (W) pertain to the identity of the user. The system then determines how many individual people would satisfy the identifiable terms present in the user write-in (W). This number of individual people is the population (Vs).

The system also determines which terms in the user write-in (W) pertain to the clarity of the subject-matter of the user write-in (W). The clarity levels ($c\_\{gi\}$) are assigned for these terms. The clarity levels ($c\_\{gi\}$) are defined by experts. For example, the levels ($c\_\{gi\}$) for the category "Life Insurance" in TABLE 2 can be defined by individuals such as insurance experts.

An example of a calculation of population (Vs) for a write-in W, in cases where W is not divided into multiple sentences, can be found in Equation (1):

$$Vs = Fs(W) = N \left[ \prod_{i \in \{i | |\{j|Ic(w_j)=i\}|>0\}} \left( \frac{\min_{j \in \{j|Ic(w_j)=i\}} s_i(w_j)}{N} \right) \right] \quad (1)$$

where Ic(w) is the item number in TABLE 1 after W is divided into keywords (it returns (−1) when w is not included in TABLE 1), $s\_i(w)$ is the population of w that belongs to item i, and N is the target population, e.g., Japan's population. If more detailed population data is obtained as statistical data, that too can be used. For example, if population data of "females in their 30's" is obtained, that can be used instead of using both "30's" and "female."

An example of a calculation of clarity (Vc) for a write-in W, in cases where W is not divided into multiple sentences, can be found in Equation (2). The category (g) is extracted from the write-in (W), and from the score ($c\_\{gi\}$) of each keyword ($w\_j$) in the write-in (W) at the category (g) and item (i). Vc is then calculated as follows (if more than one keywords which belong to same item i exist, $w\_j$ is used, yielding maximum $c\_\{gi\}$):

$$Vc = Fc(W) = \Sigma \max_{i\{j|Ic(w_j)=i\}} c_{gi}(w_j) \quad (2)$$

For each category (g), items (i) to improve the clarity of the answer are defined, and a score, or clarity level, ($c\_\{gi\}$) for each item (i) is defined according to the abstraction level (a) of each keyword (refer to TABLE 1). The score or the clarity level ($c\_\{gi\}$) is defined by an expert (e.g., a financial planner). In the example shown in TABLE 1, 10 is the highest score, and 0 means that the item in the category (g) is not supported (the keyword is not necessary to improve the clarity).

At 125, determine, using the system, if, for each of a predefined population threshold (Ts), and a predefined clarity threshold (Tc), Equations (3) and (4) are satisfied, wherein Equations (3) and (4) are defined as:

$$Vs \geq Ts \quad (3)$$

$$Vc \geq Tc. \quad (4)$$

At step 127, determine if either or both of Equations (3) and (4) are not satisfied for each threshold. If so, proceed to step 130. Otherwise, if both of Equations (3) and (4) are satisfied for each threshold, then proceed to step 128, where W can be transmitted to one or more respondents without changing.

At step 130 propose a change (W') to the user write-in (W) in which the change (ΔW) is the minimal change to the original write-in (W) that is required to satisfy Equations (3), (4), and (5). Equation (5) is defined as:

$$\Delta W = \|W' - W\| \leq Tw \quad (5)$$

wherein Tw is the upper limit of ΔW.

At step 132, to change W to satisfy Equations (3), (4), and (5), re-use the keywords ($\{w\_j\}$) from W which were created above, and performs an abstraction, embodiment, deletion, and/or addition to each $\{w\_j\}$ to satisfy Equations (3), (4), and (5), within the limitations of a user-designated rate of changes, and outputs W'. In an embodiment, the user defines an allowable range of changes (such as, abstraction, instantiation, deletion, addition, items to be added and/or deleted, etc.) from the original user-submitted write-in information. The defined allowable range of changes can be represented as function H( ).

For item, i, of each keyword, $\{w\_j\}$, $\{w'\_j\}$ ($W=\{w\_j\}$, $W'=\{w'\_j\}$), the sum of the number of new items (i) is calculated (allowing a duplicated count of a same item), (n_n) * coefficient (Cn). The number of deleted items, (n_e) * coefficient (Ce), a change of abstraction level (|A(w_i)−A(w_i')|) * coefficient(Ca), and a number of division of the question (k_i(>0)) * coefficient (Cd) are also calculated. This leads to the following expansion of Equation (5):

$$\Delta W = \|W' - W\| = C_n n_n + C_e n_e + \sum_i (C_a |A(w_i) - A(w_{i'})| + C_d(k_i - 1))$$

wherein $A(x)$ is an abstraction level of x.

At step 142, determine if any W' can satisfy Equations (3), (4), and (5) within the user-designated H( ). If so, select a W' that maximizes Vsc=Vs/Ts+Vc/Tc with minimum $\Delta W$, and proceed to step 155. Otherwise, proceed to step 145.

If a W' which satisfies all of Equations (3), (4), and (5) was not found by performing an abstraction, embodiment, deletion, and/or addition to each {w_j}, at step 145, first alter W' to satisfy only Equation (3).

At 150, divide W' into m write-in's, {W'k}, k=1, ..., m, which is equivalent to W', and include a write-in W'p, $1 \leq p \leq m$, which is what the user wants to ask. For example, as described in hereinafter, if a user, who is $4^{th}$ grade student, wants to work at broadcast station in a specific location (e.g., in Osaka) but if including the specific location in write-in causes a privacy risk (Vs<Ts) and including nothing or a broader location (e.g., Japan) causes poor clarify (Vc<Tc), the user includes several specific locations, e.g., Tokyo, Osaka, and Nagoya, which include what the user wants to ask (Osaka) and the rest (Tokyo, Nagoya) as dummy. In this case, W'p includes Osaka and the rest includes Tokyo or Nagoya. By using {W'k} instead of W', Vs is kept unchanged and the Vc of W'p increases, making it possible to satisfy all of Equations (3), (4), and (5).

As long as Equation (3) is satisfied, it is possible to use only a part of {W'k}. Additionally, by using the item division table (i.e., TABLE 2), $\Delta W$ can be kept small and Equation (5) can be easily satisfied.

TABLE 2

| Item(1) | Publication level | Abstraction level (a_i) | [ ] = example of unique division, { } = example of universal division |
|---|---|---|---|
| Address (i = 1) | City, Ward | 2 | {west, east}, {south, north}, {central, suburb} |
| | Prefecture, region | 3 | [Yamanote, Shitamachi, Tama] (Tokyo), [Shimousa, Others](Chiba), {West, East}, {South, North}, {Central, Suburb} |
| | Nation | 4 | [East Japan, West Japan](Japan), [Kyushu, Shikoku, Kansai, Chubu, Kanto, Tohoku, Hokkaido] (Japan), [Shuto area, rural area] (Japan) |
| Age (i = 3) | What teen, school grade | 2 | {early, late}, {early, mid, late} |
| Occupation (i = 4) | Sort of occupation | 3 | Company employee size = {more than 10,000, others}, Company location = {Tokyo area, others} |
| Family Structure (i = 6) | Marriage + number of children | 2 | {School of children (junior, junior high, high, university, grad} |
| | Marriage | 3 | {Have children, no child} |
| Annual Income (i = 7) | Order of XX million yen | 2 | {first half, last half} |
| | Above/Below XX million yen | 3 | {above YY million yen, above XX million yen, others} |

The calculation of Vs and Vc changes in cases where W is divided into multiple sentences. In such cases, assume $w_k$, a keyword of $W=\{w_1, \ldots, w_k, \ldots, w_n\}$, is further divided into $w_{\overline{k}} = \{w_k^{[1]}, .. w_k^{[q]} .., w_k^{[m]}\}$, where the coverage of $w_{\overline{k}}$ is equivalent to $w_k$, and $w_k^{[q]}$, $1 \leq q \leq m$, is what the user originally wants to include (ask). If the user asks |Q| questions as $$W' = \{W'^{[j]}\} = \bigcup_{j \in Q} W'^{[j]},$$

$Q \subseteq \{1, 2, \ldots, m\}$, $q \in Q$, where $W'^{[j]} = \{w_1, \ldots, w_{k-1}, w_k^{[j]}, w_{k+1}, \ldots, w_n\}$), then the clarity Vc is equal to the one for $W'^{[q]}$ while the population Vs is the one for $$\bigcup_{j \in Q} W'^{[j]},$$

where $\{W'^{[j]}\}$, $j \neq q$ are dummy questions.

Now, assuming $i = Ic(w_k)$ and that $c_{gi}(w)$ varies in proportional to $s_i(w)$, then the following Equations are satisfied:

$$c_{gi}(w_k) = as_i(w_k) + b,$$

$$c_{gi}(w_k') = as_i(w_k') + b,$$

where a and b, are unknown, $w_k'$ is a keyword that satisfies $A(w_k') = A(w_k) - 1$, and $A(x)$ is the abstraction level of x. Then, a and b can be obtained from the two Equations above, and Vs and Vc for $W' = \{W'^{[j]}\}$, $j \in Q$, after division, can be calculated as follows:

$$Vs(W') = N \left( \prod_{i, |\{j|Ic(w_j)=i\}|>0, i \neq k} \frac{\min_{\{j|Ic(w_j)=i\}} s_i(w_j)}{N} \right) \times \quad (3)$$

$$\left( \frac{\min \left( \min_{\{j|Ic(w_j)=k\}} s_k(w_j), s_k(w_{\overline{k}}) \right)}{N} \right)$$

$$Vc(W') = \sum_{i \neq p} \max_{\{j|Ic(w_j)=i\}} c_{gi}(w_j) + \max \left( \max_{\{j|Ic(w_j)=p, j \neq k\}} c_{gp}(w_j), c_{gp}(w_k^{[q]}) \right) \quad (4)$$

At step 152, adopt the changed write-in, W'. This maximizes Vsc=Vs/Ts+Vc/Tc with minimum $\Delta W$, determine if any W can satisfy Equations (3), (4). And Equation (5) within the user defined H( ). If so, select a W' that maximizes Vsc=Vs/Ts+Vc/Tc with minimum $\Delta W$, and proceed to step 155. Otherwise, proceed to step 153, where a W' that satisfy all of the Equations (3), (4), and (5) was not found. In this case, the user can be asked to totally change W or to confirm if it is okay to transmit current W' with limitation of privacy, non-clearness, and/or too much changes.

To find W' that satisfy Equations (3), (4), and (5), the system can search for possible changes within $\Delta W \geq dW$ to speed up the calculation. This is especially effective when Vs and/or Vc is small, by skipping a search of changes that satisfy ΔW<dW.

FIG. 9 depicts TABLE 3 showing the least necessary amount to change db(dWDB), assuming, from TABLE 1, that g=3, Ts=13000, and Tc=16. In detail, first calculate Vs/Ts and Vc/Tc with original W, then find the minimal changes to be applied to W from the TABLE 3, and thereafter apply the changes equal to or more than that value to W, which satisfies both Equations (3) and (4), while confirming that the change also satisfies Equation (5). For example, if Vs/Ts=0.8 and Vc/Tc=0.6, W needs to be changed with ΔW≥6 changes, where an example to calculate ΔW is described above (before changed)

At step 155, transmit the updated write-in (W') to one or more respondents so that the one or more respondents can respond to the updated write-in (W').

Figure 4:
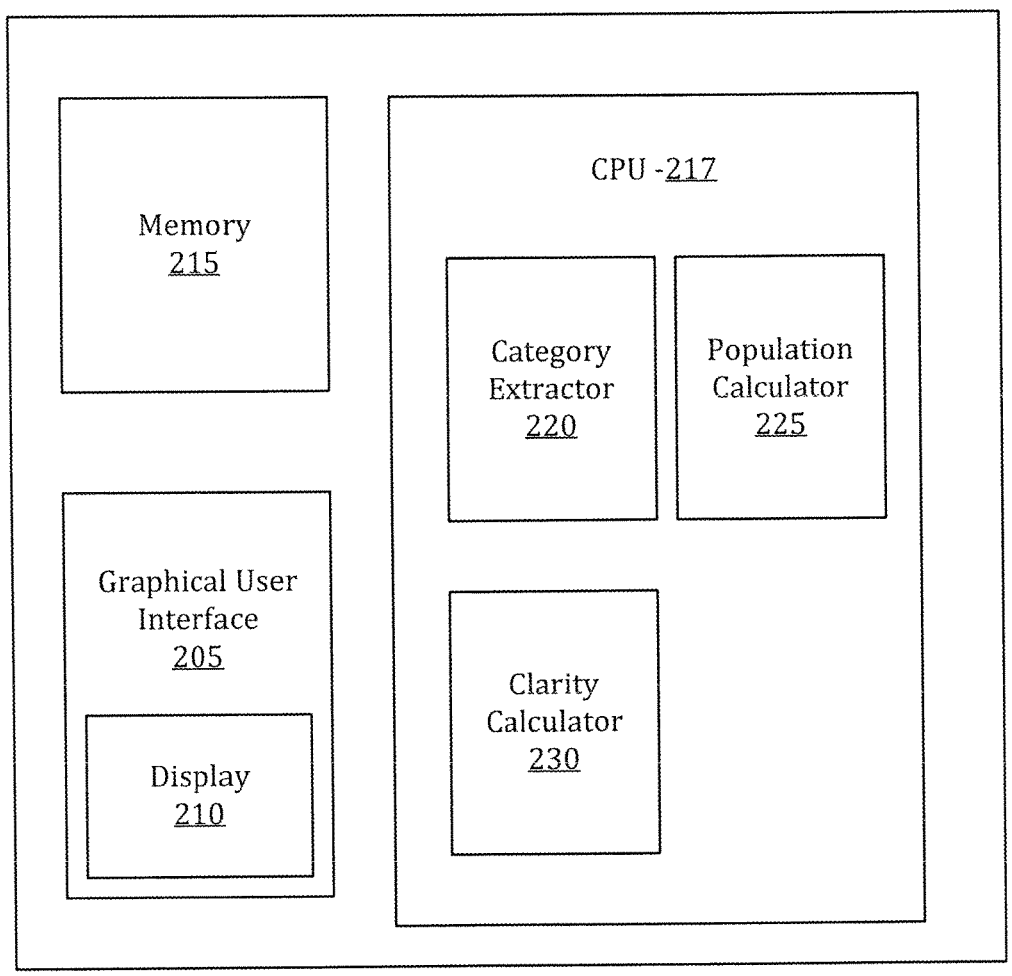
FIG. 4 shows an exemplary system for allowing users to share an amount of information required in order to enable respondents to accurately answer any inquiries, while still maintaining the privacy of the users, in accordance with an embodiment of the present invention.

Referring now to FIG. 4, an exemplary system 200 is provided for altering original user-inputted data to achieve a level of both privacy and clarity in the altered user-inputted data, in accordance with an embodiment of the present invention.

The system 200 includes one or more graphical user interfaces 205 (including one or more displays 210), one or more memories 215, and one or more computer processors (CPUs) 217 which contain one or more of a category extractor (Fg) 220, a population calculator (Fs) 225, and a clarity calculator (Fc) 230.

The memory 215 can store inquiries which a user may be required to provide information, can store user-submitted information (W), and can contain a clarity table (Dc) that includes abstraction levels (a_i) and clarity levels (c_{gi}) for categories (g) and a keyword items (i) located in the user write-in (W).

The category extractor (Fg) 220 extracts categories (g) into which the subject-matter of the write-in (W) belongs. The population calculator (Fs) 225 calculates the population (Vs) that corresponds to the terms in the write-in (W) pertaining to the identity of the user. The clarity calculator (Fc) 230 calculates the clarity (Vc) of the terms in the write-in (W) for each category (g).

The user's tolerance range (H( )) is inputted into the system and designates the items, words, phrases, etc., that the user does not want deleted, added, abstracted, or embodied.

Figure 5:
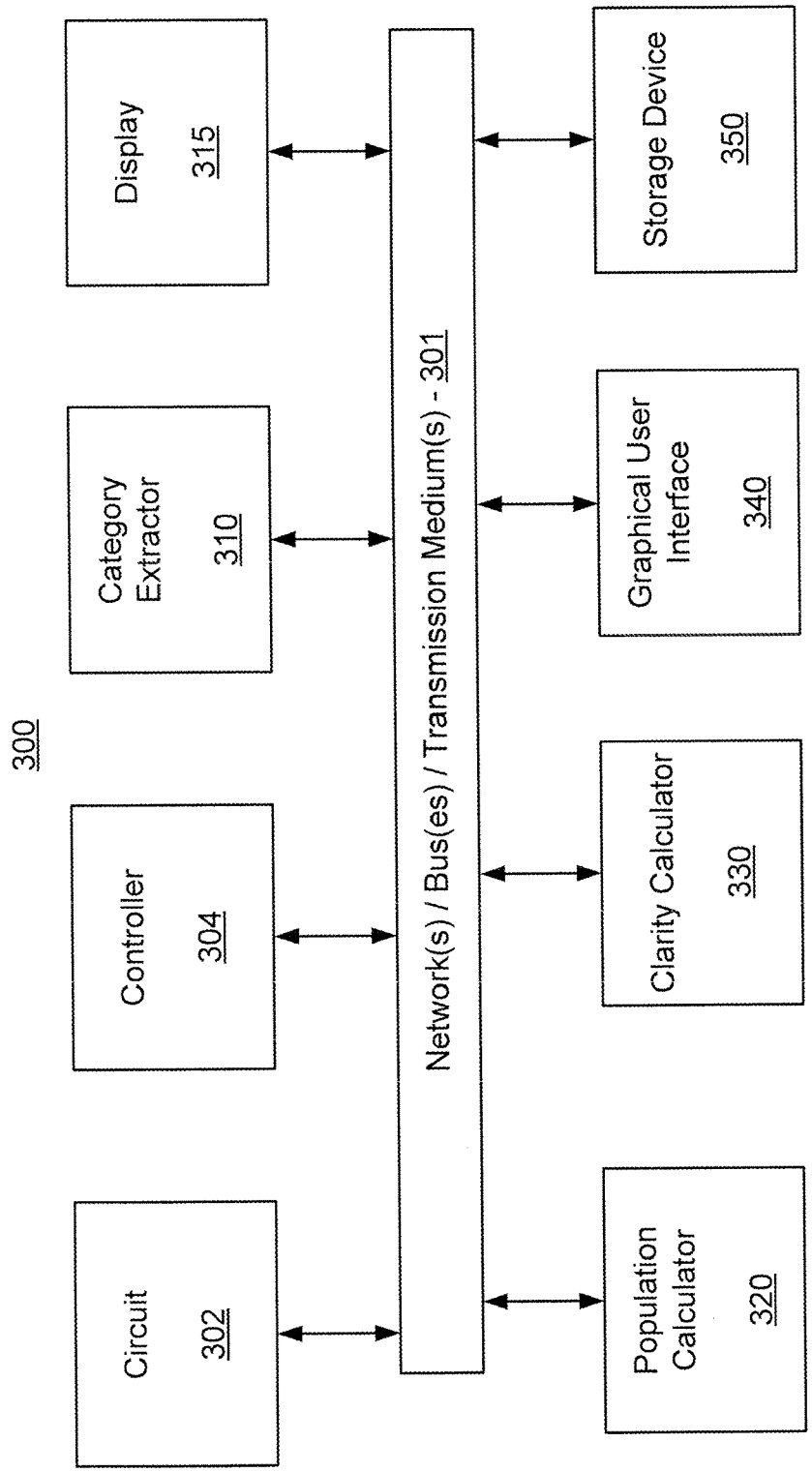
FIG. 5 shows an exemplary system for decreasing user privacy risk and increasing clarity in social media systems, in accordance with an embodiment of the present invention.

Referring now to FIG. 5, an exemplary system 300 for decreasing user privacy risk and increasing clarity in social media systems is illustratively depicted in accordance with an embodiment of the present invention.

While many aspects of system 300 are described in singular form for the sake of illustration and clarity, the same can be applied to multiple ones of the items mentioned with respect to the description of system 300. For example, while a single display 315 is mentioned with respect to system 300, more than one display 315 can be used in accordance with the teachings of the present invention, while maintaining the spirit of the present invention. Moreover, it is appreciated that the display 315 is but one aspect involved with system 300 that can be extended to plural form while maintaining the spirit of the present invention.

In an embodiment, the system 300 can include a plurality of components which, in turn, can include one or more circuits 302, controllers 304, category extractors 310, displays 315, population calculators 320, clarity calculators 330, graphical user interfaces 340, and/or storage devices 350 (e.g., computer readable storage medium). The above components can be connected by, for example, one or more networks, buses, or transmission mediums 301, wherein the one or more networks can include one or more wired or wireless networks such as, e.g., WIFI, Bluetooth®, etc., and the one or more transmission mediums can include bounded transmission media, such as, coaxial cable, fiber optics, etc., and unbounded transmission media, such as, radio transmission, microwave transmission, etc. Furthermore, data (e.g., system condition data, temperature, voltage, etc.) can be collected according to various embodiments of the present invention. The bus can be connected to any components via a wired or wireless connection.

In an embodiment, the graphical user interface 340 can be employed to enable a user to input an initial write-in (W).

In an embodiment, the category extractor 310 can be employed to extract categories (g) into which the subject-matter of the write-in (W) belong.

In an embodiment, the population calculator 320 can be employed to calculate the population (Vs) that corresponds to the write-in (W).

In an embodiment, the clarity calculator 330 can be employed to calculate the clarity (Vc) of the write-in (W) for each category (g).

At least one storage device 560 can be employed to store, e.g., the initial write-in (W), the updated write-in (W'), etc.

Figure 6:
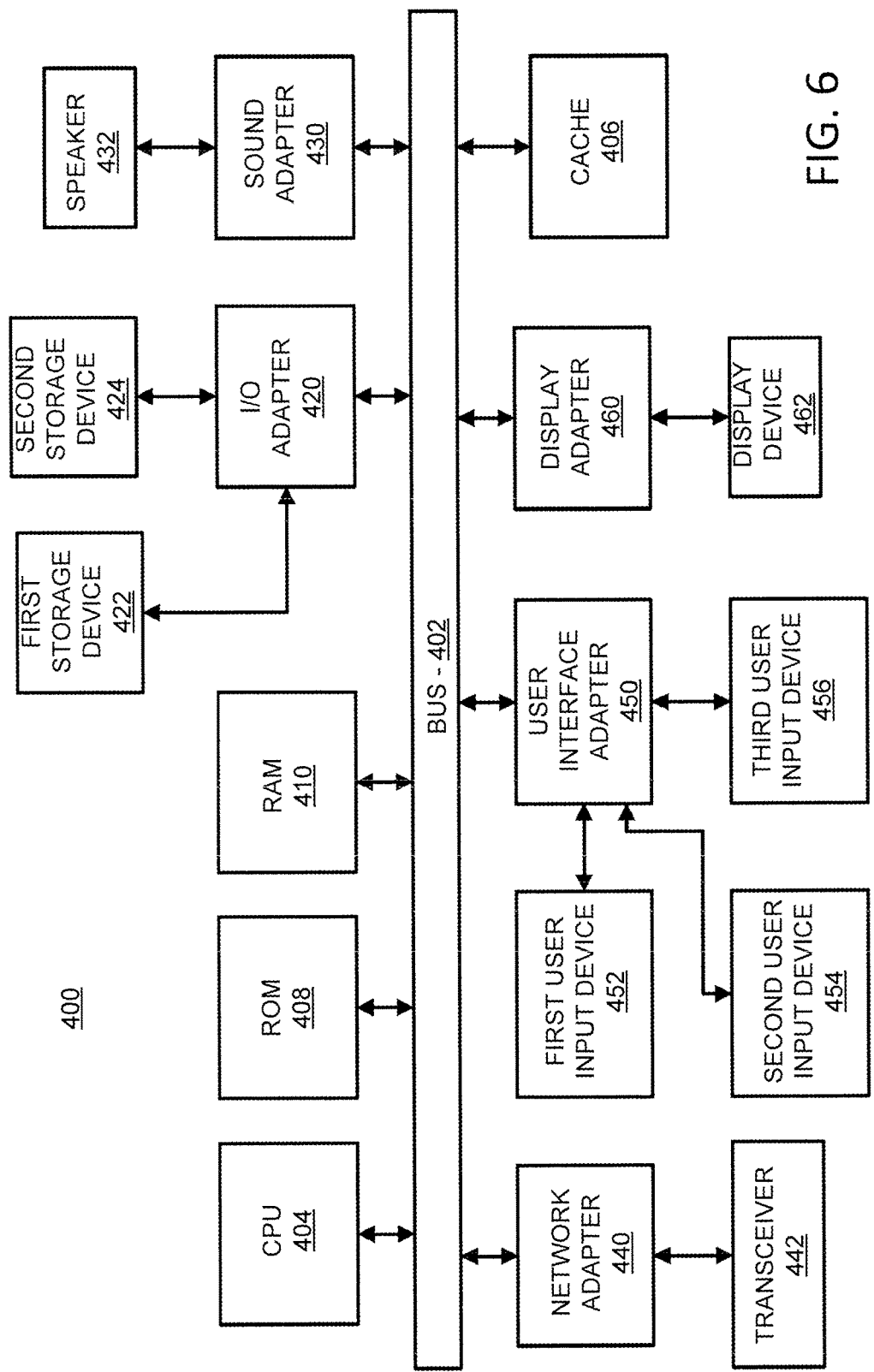
FIG. 6 shows an exemplary processing system, to which the present invention can be applied, in accordance with an embodiment of the present invention.

Referring now to FIG. 6, an exemplary processing system 400 to which the present invention can be applied is shown in accordance with an embodiment of the present invention. The processing system 400 includes at least one processor (CPU) 404 operatively coupled to other components via a system bus 402. A cache 406, a Read Only Memory (ROM) 408, a Random Access Memory (RAM) 410, an input/output (I/O) adapter 420, a sound adapter 430, a network adapter 440, a user interface adapter 450, and a display adapter 460, are operatively coupled to the system bus 402.

The processing system 400 includes at least one processor (CPU) 404 operatively coupled to other components via one or more networks, buses, or transmission mediums 402, wherein the system bus 402 can be connected to any components via one or more wired or wireless networks such as, e.g., WIFI, Bluetooth®, etc., and the one or more transmission mediums can include bounded transmission media, such as, e.g., coaxial cable, fiber optics, etc., and unbounded transmission media, such as, e.g., radio transmission, microwave transmission, etc. A cache 406, a Read Only Memory (ROM) 408, a Random Access Memory (RAM) 410, an input/output (I/O) adapter 420, a sound adapter 430, a network adapter 440, a user interface adapter 450, and a display adapter 460, are operatively coupled to the system bus 402.

A speaker 432 is operatively coupled to system bus 402 by the sound adapter 430. A transceiver 442 is operatively coupled to system bus 402 by network adapter 440. A display device 462 is operatively coupled to system bus 402 by display adapter 460.

A first user input device 452, a second user input device 454, and a third user input device 456 are operatively coupled to system bus 402 by user interface adapter 450. The user input devices 452, 454, and 456 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 452, 454, and 456 can be the same type of user input device or different types of user input devices. The user input devices 452, 454, and 456 are used to input and output information to and from system 400.

Of course, the processing system 400 can also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present invention provided herein.

Moreover, it is to be appreciated that system 200, described with respect to FIG. 4, is a block diagram showing a system 200 for implementing respective embodiments of the present invention. Part or all of processing system 200 can be implemented in one or more of the elements of system 400 of FIG. 5.

Further, it is to be appreciated that processing system 400 can perform at least part of the methods described herein including, for example, at least part of method 100 of FIGS. 1-3. Similarly, part or all of system 300 of FIG. 5 can be used to perform at least part of the methods described herein including, for example, at least part of method 100 of FIGS. 1-3, system 200 of FIG. 4, and system 300 of FIG. 6.

The following is an example scenario in accordance with the present invention.

User inputs an original write-in (W). The original write-in states: "I'm a $4^{th}$ grade XX university male student. I hope to work at broadcast station. Give me a good advice."

The user sets the following user tolerance range (H( )): no change is to be made to the name of the university, the user's grade, and the user's gender. Furthermore, the user is from Osaka and indicates that he wants to find a job in the Osaka area.

There is a problem with the user's original write-in (W): the original write-in does not satisfy clarity (Equation (4)). However, population (privacy) (from Equation (3)) is satisfied. If the write-in (W) is changed to include that the user wants to find a job in Osaka, population will not be satisfied.

According to the native method, the following altered write-in may have been created: "I'm a $4^{th}$ grade XX university male student. I hope to work at broadcast station in Osaka area. Give me a good advice." This altered write-in does not satisfy Equation (3).

According to an embodiment of the method of the present invention, the following altered write-in can be created: "I'm a $4^{th}$ grade XX university male student. I hope to work at broadcast station in Tomeihan area. Give me a good advice for Tokyo, Nagoya, and Osaka, respectively." This altered write-in increases the clarity (including Osaka, which the user signified he wanted to ask). Additionally, by adding dummy locations (Tokyo, Nagoya), population is also satisfied. This corresponds to the division at i=1, a=4 in TABLE 1.

The following is another example scenario in accordance with the present invention.

User inputs an original write-in: "I want to consult about a cramming school for my son who is in fourth grade of a public elementary school in Nakano city. He is now going to XX cramming school, but taking a junior high-school entrance examination into consideration, I'd like change it. What do you recommend?" It is noted that Nakano is one of the cities in Tokyo.

The user sets the following user tolerance range (H( )): taking locality into consideration, the user does not want to change the region and cramming information.

There is a problem with the user's original write-in: the original write-in does not satisfy population (Equation (3)) from the son's age, locality, and name of the cramming school.

According to a native method, the following altered write-in may have been created: "I want to consult about a cramming school for my son who is in fourth grade of a public elementary school in Tokyo metropolitan area. He is now attending XX cramming school, but taking a junior high-school entrance examination into consideration, I'd like change it to a high level one. What do you recommend?" Clarity would not be satisfied from this native method.

According to another native method, the following altered write-in may have been created: "I want to consult about a cramming school for my son who is in higher classes of a public elementary school in Nakano city. He is now attending XX cramming school, but taking a junior high-school entrance examination into consideration, I'd like change it to a high level one. What do you recommend?" Clarity would also not be satisfied by this native method.

According to yet another native method, the following altered write-in may have been created: "I want to consult about a cramming school for my son who is in fourth grade of a public elementary school in Nakano city. He is now attending a cramming school, but taking a junior high-school entrance examination into consideration, I'd like change it to a high level one. What do you recommend?" Clarity would also not be satisfied by this native method.

Not only do these native methods not satisfy clarity, but the user also does not know which of these 3 native methods is the closest to satisfy the Equations (3), (4), and (5).

According to an embodiment of the method of the present invention, the following altered write-in (changed from the first native method) is created: "I want to consult about a cramming school for my son who is in fourth grade of a public elementary school in old 3rd district (Nakano, Suginami, Nerima). He is now attending a cramming school, but taking a junior high-school entrance examination into consideration, I'd like change it. What do you recommend?" The following altered write-in is not asking to answer for each city since it is apparent that the answer is different per city. The user only has to select the answer for Nakano-city. Clarity is unchanged and population is satisfied. This corresponds to i=1, a=3 in TABLE 1. According to this method, "in Nakano city" is first changed to "in Metropolitan area," then, after division, is rewritten to "in old 3rd district (Nakano, Suginami, Nerima)."

According to an embodiment of the method of the present invention, the following altered write-in (changed from the second native method) is created: "I want to consult about a cramming school for my son who is in higher classes of a public elementary school in Nakano city. He is now attending a cramming school, but taking a junior high-school entrance examination into consideration, I'd like change it to a high level one. What do you recommend for each grade, respectively?" The following altered write-in corresponds to i=3, a=2 in TABLE 1. According to this method, "fourth grade" is first changed to "higher classes," then changed to "higher classes" plus "for each grade, respectively."

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
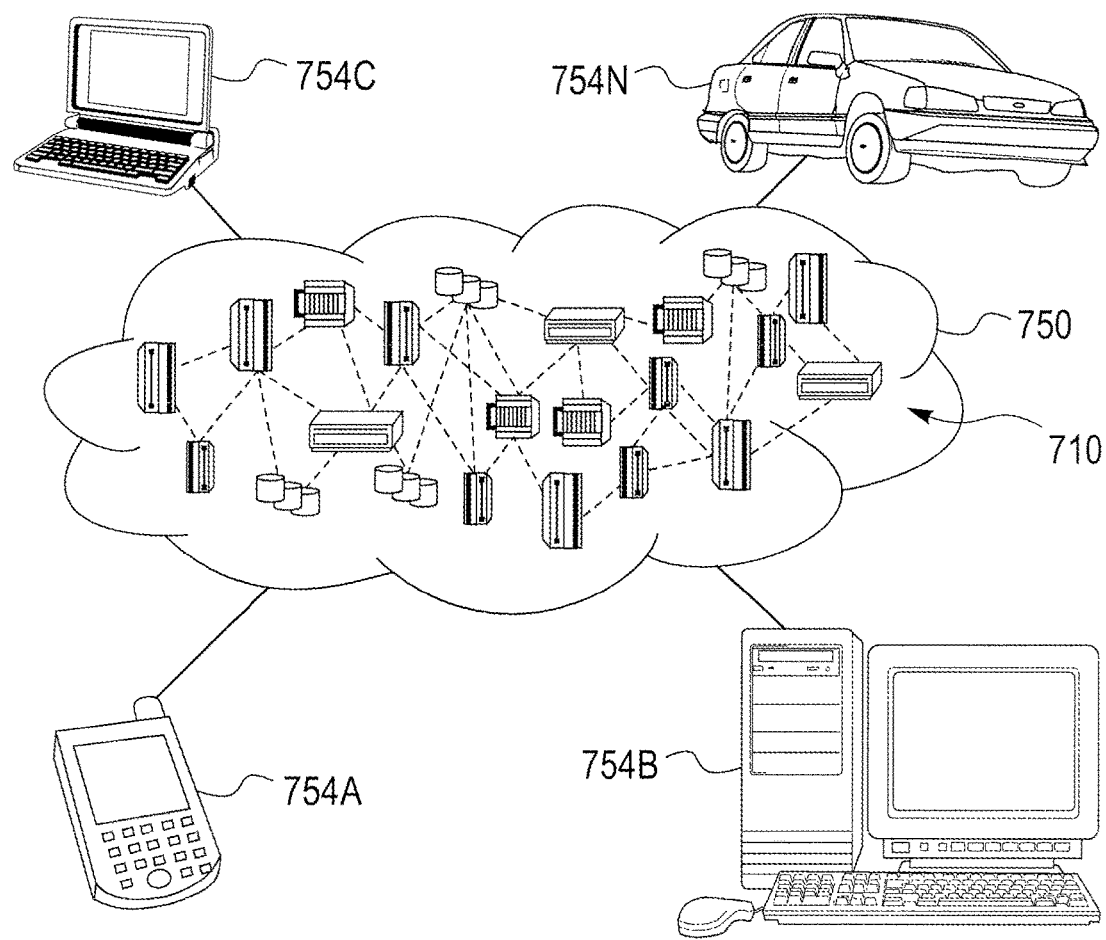
FIG. 7 depicts a cloud computing environment in accordance with an embodiment of the present invention.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
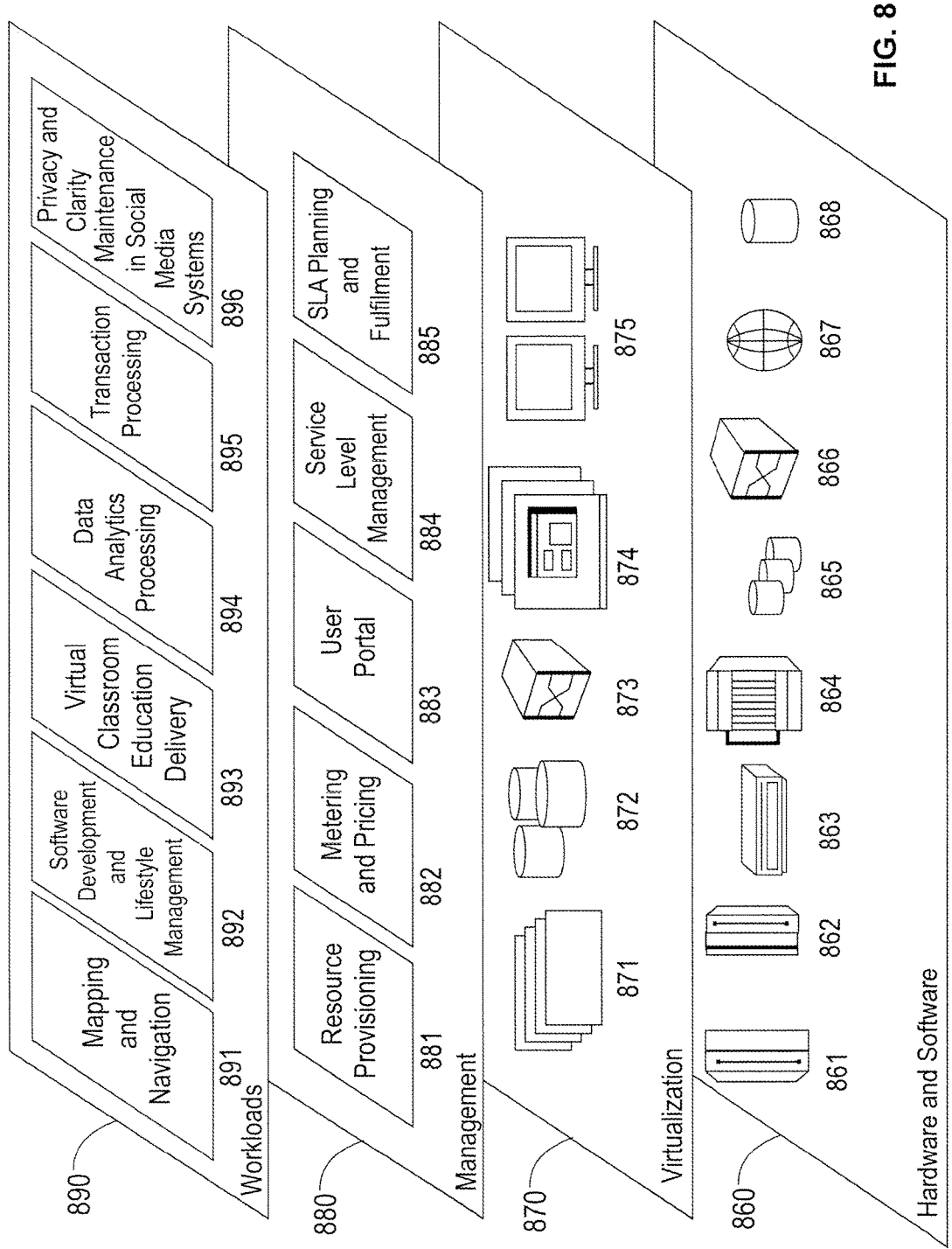
FIG. 8 depicts abstraction model layers in accordance with an embodiment of the present invention.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and privacy and clarity maintenance in social media systems 896.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for decreasing privacy risk and increasing clarity in a social media system, comprising:

separating initial user-inputted data into a plurality of terms;

receiving, into a memory device, a tolerance range from the user, wherein the tolerance range designates one or more of the plurality of terms that are not to be altered;

determining which of the plurality of terms are identity-related terms relating to an identity of a user, and which of the plurality of terms are clarity-related terms relating to subject-matter clarity;

calculating, using a processor, a population value, wherein the population value is a number of individuals that satisfies the identity-related terms;

assigning a clarity level representing a respective amount of clarity to each of the clarity-related terms;

creating amended user-inputted data by amending the initial user-inputted data such that the population value of the amended user-inputter data is greater than or equal to a first predefined threshold, and the sum of the clarity levels assigned to each of the clarity-related terms in the amended user-inputter data is greater than or equal to a second predefined threshold; and transmitting, using a graphical user interface, the amended user-inputted data to one or more respondents.

2. The method of claim 1, further comprising:

identifying categories from the initial user-inputted data, and automatically defining the categories, wherein the clarity level for each of the clarity-related terms is recorded within a respective category from a set of categories.

3. The method of claim 2, wherein the clarity level for each of the clarity-related terms is assigned to the respective category from the set of categories by a respective expert in a technological field relating to the respective category.

4. The method of claim 1, further comprising performing, on one or more of the plurality of terms, an action selected from the group consisting of abstracting, embodying, deleting, and adding.

5. The method of claim 1, wherein the population is calculated using statistical data to determine the number of individuals that satisfies the identity-related terms.

6. The method of claim 1, where the clarity level is calculated by summing respective clarity levels of each of a set of items relating to the clarity-related terms.

7. The method of claim 1, wherein said creating step comprises:

initially altering the user-inputted data to create altered data, wherein the population value is greater than or equal to the first predefined threshold; and dividing the altered data into two or more sentences of separated data, wherein at least one of the two or more sentences includes user-inputted data representing a user query, wherein the clarity level of the one of the two or more sentences is greater than or equal to the second predefine threshold.

8. A non-transitory computer-readable storage medium including a computer-readable program for decreasing privacy risk and increasing clarity in a social media system, wherein the computer-readable program when executed on a computer causes the computer to perform a method comprising the steps of:

separating initial user-inputted data into a plurality of terms;

receiving, into a memory device, a tolerance range from the user, wherein the tolerance range designates one or more of the plurality of terms that are not to be altered;

determining which of the plurality of terms are identity-related terms relating to an identity of a user, and which of the plurality of terms are clarity-related terms relating to subject-matter clarity;

calculating, using a processor, a population value, wherein the population value is a number of individuals that satisfies the identity-related terms;

assigning a clarity level representing a respective amount of clarity to each of the clarity-related terms;

creating amended user-inputted data by amending the initial user-inputted data such that the population value of the amended user-inputter data is greater than or equal to a first predefined threshold, and the sum of the clarity levels assigned to each of the clarity-related terms in the amended user-inputter data is greater than or equal to a second predefined threshold; and transmitting, using a graphical user interface, the amended user-inputted data to one or more respondents.

9. The non-transitory computer-readable storage medium of claim 8, wherein the method further comprises:

identifying categories from the initial user-inputted data, and automatically defining the categories, wherein the clarity level for each of the clarity-related terms is recorded within a respective category from a set of categories.

10. The non-transitory computer-readable storage medium of claim 9, wherein the clarity level for each of the clarity-related terms is assigned to the respective category from the set of categories by a respective expert in a technological field relating to the respective category.

11. The non-transitory computer-readable storage medium of claim 8, wherein the method further comprises performing, on one or more of the plurality of terms, an action selected from the group consisting of abstracting, embodying, deleting, and adding.

12. The non-transitory computer-readable storage medium of claim 8, wherein the population is calculated using statistical data to determine the number of individuals that satisfies the identity-related terms.

13. The non-transitory computer-readable storage medium of claim 8, where the clarity level is calculated by summing respective clarity levels of each of a set of items relating to the clarity-related terms.

14. The non-transitory computer-readable storage medium of claim 8, wherein said creating step comprises:

initially altering the user-inputted data to create altered data, wherein the population value is greater than or equal to the first predefined threshold; and dividing the altered data into two or more sentences of separated data, wherein at least one of the two or more sentences includes user-inputted data representing a user query, wherein the clarity level of the one of the two or more sentences is greater than or equal to the second predefine threshold.

15. A system for decreasing privacy risk and increasing clarity in a social media system, comprising:

a processor configured to:

separate initial user-inputted data into a plurality of terms;

determine which of the terms are identity-related terms relating to an identity of a user, and which of the terms are clarity-related terms relating to subject-matter clarity;

calculate a population value, wherein the population value is a number of individuals that satisfies the identity-related terms;

assign a clarity level representing a respective amount of clarity to each of the clarity-related terms; and create amended user-inputted data by amending the initial user-inputted data so that the population value of the amended user-inputter data is greater than or equal to a first predefined threshold, and the sum of the clarity levels assigned to each of the clarity-related terms is greater than or equal to a second predefined threshold;

a memory configured to store the initial user-inputted data, the population value, the clarity values, the first predefined threshold, and the second predefined threshold, wherein the memory is further configured to store a tolerance range from the user, wherein the tolerance range designates one or more of the plurality of terms that are not to be altered; and a graphical user interface configured to transmit the amended user-inputted data to one or more respondents.

* * * * *